(12) United States Patent
Prado et al.

(10) Patent No.: US 9,411,506 B1
(45) Date of Patent: Aug. 9, 2016

(54) PROVIDING ADDITIONAL FUNCTIONALITY FOR A GROUP MESSAGING APPLICATION

(75) Inventors: Jason Barret Prado, San Francisco, CA (US); Benjamin David Eidelson, Palo Alto, CA (US); Gregory Matthew Marra, San Francisco, CA (US)

(73) Assignee: Google Inc., Mountain View, CA (US)

(*) Notice: Subject to any disclaimer, the term of this patent is extended or adjusted under 35 U.S.C. 154(b) by 175 days.

(21) Appl. No.: 13/533,873

(22) Filed: Jun. 26, 2012

Related U.S. Application Data

(60) Provisional application No. 61/502,324, filed on Jun. 28, 2011.

(51) Int. Cl.
| | | |
|---|---|---|
| G06F 3/0488 | (2013.01) | |
| H04M 1/725 | (2006.01) | |
| H04L 12/18 | (2006.01) | |
| G06Q 50/00 | (2012.01) | |
| H04L 12/58 | (2006.01) | |
| G06F 3/0481 | (2013.01) | |

(52) U.S. Cl.
CPC ........ G06F 3/04883 (2013.01); *G06F 3/04817* (2013.01); *G06Q 50/01* (2013.01); *H04L 12/1831* (2013.01); *H04L 12/581* (2013.01); *H04L 51/04* (2013.01); *H04M 1/72552* (2013.01)

(58) Field of Classification Search
CPC .............................. H04L 12/581; G06Q 50/01
USPC ........................................................ 705/319
See application file for complete search history.

(56) References Cited

U.S. PATENT DOCUMENTS

| | | | | |
|---|---|---|---|---|
| 6,256,663 | B1* | 7/2001 | Davis | 709/204 |
| 6,400,381 | B1* | 6/2002 | Barrett et al. | 715/758 |
| 6,630,944 | B1* | 10/2003 | Kakuta et al. | 715/758 |
| 7,343,561 | B1* | 3/2008 | Stochosky et al. | 715/758 |
| 7,383,291 | B2* | 6/2008 | Guiheneuf et al. | 715/751 |
| 7,620,902 | B2* | 11/2009 | Manion et al. | 715/758 |
| 7,721,216 | B2* | 5/2010 | Zaner | H04L 12/1822 715/733 |
| 7,752,552 | B2* | 7/2010 | Pennington et al. | 715/751 |
| 7,828,661 | B1* | 11/2010 | Fish et al. | 463/42 |
| 7,870,199 | B2* | 1/2011 | Galli | G06F 9/547 709/206 |

(Continued)

OTHER PUBLICATIONS

Author: Glen Chapman Title: Facebook reveals new 'Groups'feature to bring cosy cliques back to online social networking Date: Oct. 7, 2010 pp. 1-3.*

(Continued)

*Primary Examiner* — Ajay Bhatia
*Assistant Examiner* — Phoebe Pan
(74) *Attorney, Agent, or Firm* — McDermott Will & Emery LLP

(57) ABSTRACT

Configurations providing one or more group objects for extending the functionality of a group messaging application. Some example group objects provide functionality for location-sharing, games, events, calendar, photos, videos, money sending, video calling, audio calling, or a map view of one or more participants in a conversation. Each group object can provide contextual content including semantically relevant information with respect to the participants of the conversation. For instance, each conversation participant can modify the included group object(s) in the context of the conversation. A notification can then be provided to the conversation participants. By viewing the conversation in the group messaging application, contextual information from an included group object for the participants in the conversation can be provided.

26 Claims, 6 Drawing Sheets

(56) References Cited

U.S. PATENT DOCUMENTS

| | | | | |
|---|---|---|---|---|
| 8,180,804 | B1* | 5/2012 | Narayanan et al. | 707/798 |
| 8,185,558 | B1* | 5/2012 | Narayanan et al. | 707/798 |
| 8,303,415 | B2* | 11/2012 | Craine et al. | 463/42 |
| 8,577,975 | B2* | 11/2013 | Groves et al. | 709/206 |
| 8,583,751 | B2* | 11/2013 | Crawford | 709/206 |
| 8,850,319 | B2* | 9/2014 | Stoen | H04L 12/581 715/704 |
| 2002/0144273 | A1* | 10/2002 | Reto | 725/86 |
| 2003/0177019 | A1* | 9/2003 | Santos et al. | 705/1 |
| 2004/0224772 | A1* | 11/2004 | Canessa et al. | 463/42 |
| 2005/0125737 | A1* | 6/2005 | Allen et al. | 715/758 |
| 2005/0172001 | A1* | 8/2005 | Zaner et al. | 709/205 |
| 2006/0100006 | A1* | 5/2006 | Mitchell et al. | 463/9 |
| 2007/0179792 | A1* | 8/2007 | Kramer | 705/1 |
| 2007/0282621 | A1* | 12/2007 | Altman et al. | 705/1 |
| 2008/0163379 | A1* | 7/2008 | Robinson et al. | 726/27 |
| 2008/0281622 | A1* | 11/2008 | Hoal | 705/1 |
| 2008/0288277 | A1* | 11/2008 | Fasciano | 705/1 |
| 2009/0132527 | A1* | 5/2009 | Sheshagiri et al. | 707/5 |
| 2009/0144392 | A1* | 6/2009 | Wang et al. | 709/217 |
| 2009/0158200 | A1* | 6/2009 | Palahnuk et al. | 715/781 |
| 2009/0177981 | A1* | 7/2009 | Christie et al. | 715/758 |
| 2009/0182589 | A1* | 7/2009 | Kendall et al. | 705/5 |
| 2009/0249223 | A1* | 10/2009 | Barsook et al. | 715/753 |
| 2009/0249244 | A1* | 10/2009 | Robinson et al. | 715/781 |
| 2009/0288007 | A1* | 11/2009 | Leacock et al. | 715/716 |
| 2009/0288150 | A1* | 11/2009 | Toomim et al. | 726/5 |
| 2009/0307614 | A1* | 12/2009 | Craig et al. | 715/758 |
| 2010/0049852 | A1* | 2/2010 | Whitnah et al. | 709/226 |
| 2010/0057754 | A1* | 3/2010 | Moudy et al. | 707/100 |
| 2010/0125785 | A1* | 5/2010 | Moore et al. | 715/702 |
| 2010/0125811 | A1* | 5/2010 | Moore et al. | 715/846 |
| 2010/0138502 | A1* | 6/2010 | Miller et al. | 709/206 |
| 2010/0138756 | A1* | 6/2010 | Saund et al. | 715/758 |
| 2010/0162133 | A1* | 6/2010 | Pascal et al. | 715/752 |
| 2010/0185520 | A1* | 7/2010 | Gottfried | 705/14.73 |
| 2010/0217645 | A1* | 8/2010 | Jin et al. | 705/9 |
| 2011/0072098 | A1* | 3/2011 | Moudy et al. | 709/206 |
| 2011/0083101 | A1* | 4/2011 | Sharon et al. | 715/800 |
| 2011/0185025 | A1* | 7/2011 | Cherukuri et al. | 709/206 |
| 2013/0124978 | A1* | 5/2013 | Horns | G06F 3/0481 715/243 |

OTHER PUBLICATIONS

Author: Tuneo Title: Tuneo's Blog—How to easilyschedule an event on Facebookwith Tuneo Events Date: Mar. 21, 2011 pp. 1-3.*

* cited by examiner

PROVIDING ADDITIONAL FUNCTIONALITY FOR A GROUP MESSAGING APPLICATION

CROSS-REFERENCE TO RELATED APPLICATIONS

The present application claims the benefit of priority under 35 U.S.C. §119 from U.S. Provisional Patent Application Ser. No. 61/502,324 entitled "PROVIDING ADDITIONAL FUNCTIONALITY FOR A GROUP MESSAGING APPLICATION," filed on Jun. 28, 2011, the disclosure of which is hereby incorporated by reference in its entirety for all purposes.

BACKGROUND

People use electronic social networking services as tools for building and maintaining networks of personal, familial, academic, professional, and other interpersonal relationships. Collectively, a user's network of relationships is referred to as the user's social graph. For a mobile device client accessing these social networking services, the user's social graph can reside in a contacts list (e.g., a phone address book) stored on the mobile device. Communication within subgroups of contacts from such a contacts list may be difficult for a user. Moreover, additional functionality for one or more subgroups of the user's contacts may not be easily extensible.

SUMMARY

The subject technology provides one or more group objects with different functionality in a group messaging application (e.g., a chat application such as an instant messaging program). User input is received to activate a group object in a conversation between two or more participants in which the group object provides additional functionality in a group messaging application for the two or more participants, and the group object represents a shared state between the two or more participants. The group object is activated in response to the received user input. Data is received for modifying the group object in the conversation in which the data includes contextual information for the one or more participants in the conversation. A notification is provided in the conversation indicating the contextual information in which the notification represents an update to the group object that is communicated to the two or more participants in the conversation.

Another aspect of the subject technology provides a system for providing a platform for group interactivity between one or more participants of a conversation. The system includes a conversation module configured to initiate a conversation between two or more participants. The system includes a shared group object module configured to provide a shared object space for one or more group objects in the conversation. The system further includes a rendering module configured to provide a user-interface for interacting with the one or more group objects in the conversation and configured to receive user input for interacting with the one or more group objects. Additionally, the system includes a notification module configured to provide one or more notifications in the user-interface in which the one or more notifications include contextually relevant information for the one or more participants in the conversation.

Yet another aspect of the subject technology provides for receiving user input to activate a group object in a conversation between two or more participants in which the group object is represented as a graphical icon within a graphical user interface (GUI) of the conversation. The group object is then activated in response to the received user input in which activating the group object involves displaying a set of graphical elements within the GUI of the conversation. Data is then received for modifying the group object in the conversation in which the data includes contextual information for the one or more participants in the conversation. Further, a notification is provided in the conversation indicating the contextual information.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
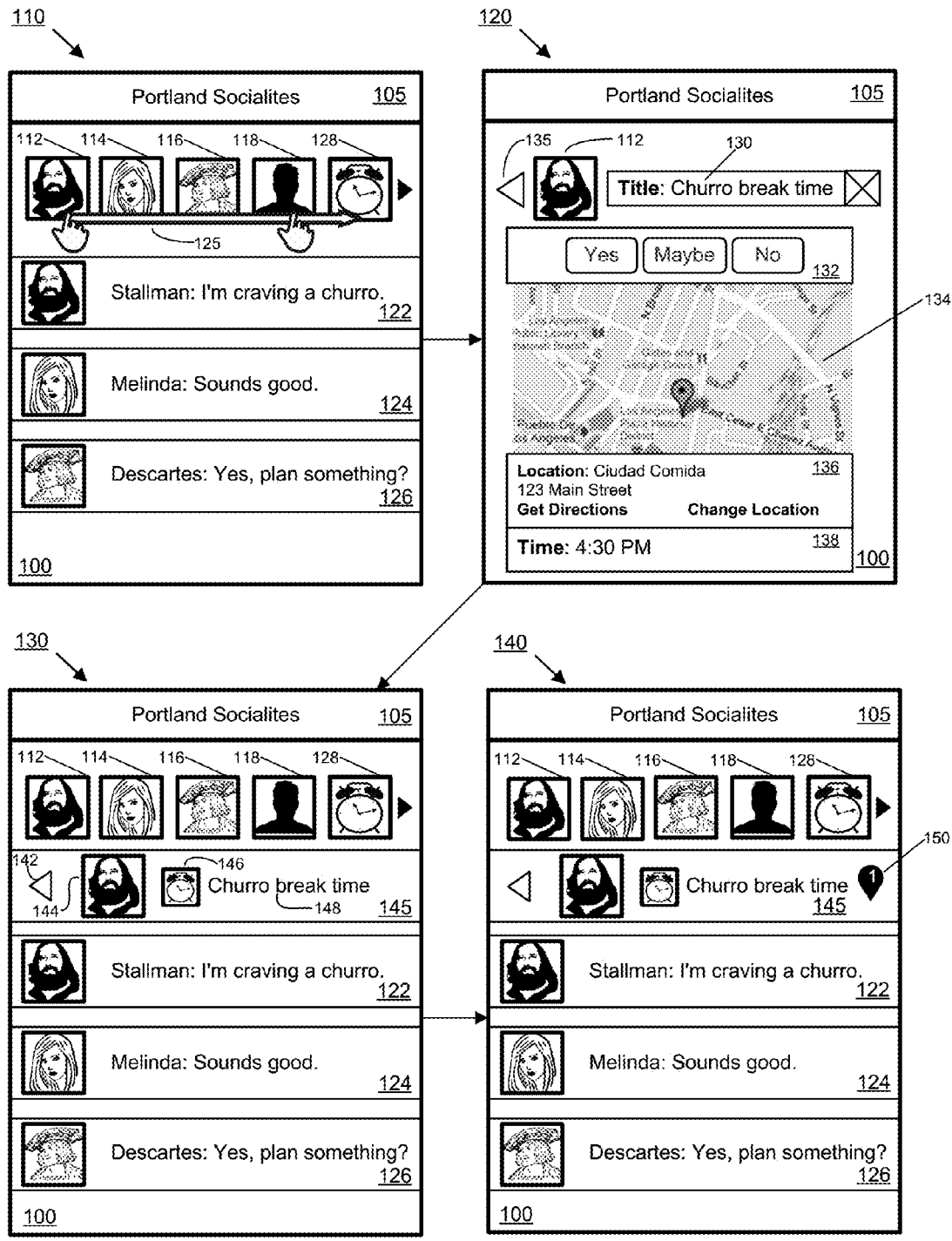
FIG. 1 conceptually illustrates an example graphical user interface in different stages for activating a group object in a conversation of a group messaging application.

The detailed description set forth below is intended as a description of various configurations of the subject technology and is not intended to represent the only configurations in which the subject technology may be practiced. However, the subject technology is not limited to the specific details set forth herein and may be practiced without these specific details. In some instances, well-known structures and components are shown in block diagram form in order to avoid obscuring the concepts of the subject technology.

For a given group messaging application, the subject technology provides a platform in which functionality for the group messaging application can be extended to provide group-centric communication among one or more participants in a group. The platform is described in more detail as discussed below.

In a group messaging application for a mobile device, a group of participants can interact and communicate with other participants in a conversation (e.g., a group message). As used herein, the term "conversation" collectively refers to a container group message between one or more participants that can include one or more different messages sent between the participants. For instance, a participant can create and transmit an initial group message (i.e., the container group message) to other participants of the group to initiate a conversation. Any participant can then subsequently create additional group messages within the context of the container group message to send between the participants in the conversation.

In some configurations, the group messaging application can be provided for a social networking service in which one or more participants of a conversation are different users in the social networking service. For instance, a social networking user (e.g., a participant in a conversation) can utilize the group messaging application in order to create a conversation between one or more different users in the social networking service (e.g., the user's social networking contacts). In one example, the social networking user can communicate with a subset of the user's contacts in the social networking service by creating a conversation using the group messaging application. The subset can correspond to a preset group of contacts, or a group of contacts individually selected by the user.

To extend the functionality of the group messaging application, one or more group objects providing different functionality can be included in the conversation. Some example group objects provide functionality for location-sharing, games, events, calendar, photos, and videos for participants of the conversation. Each group object can provide contextual content including semantically relevant information with respect to the participants of the conversation. By viewing the conversation in the group messaging application, a user can discern contextual information from an included group object for the participants in the conversation. By way of example, the contextual information can indicate a participant's activity or input associated with the group object within a view of the conversation.

In one example, the group messaging application can display a toolbar (or similar graphical element) with a visual depiction (e.g., avatars, icons, etc.) of each participant in a conversation. When a group object is not activated in the conversation, the group object can be visually represented in the toolbar as an icon or thumbnail image. A user can add or activate a new group object to the conversation by swiping the toolbar (e.g., on a touch-sensitive device) or selecting the group object icon in the toolbar.

Upon activation, the group object can provide a graphical user interface for presenting one or more different graphical elements for user input (e.g., buttons, text input, etc.) that enables the user to modify the group object. Depending on the functionality provided by the group object, the input provided by the user can include contextually relevant information for participants in the conversation. For example, in a planning group object, the user can modify the group object to include scheduling data (e.g., time, location, etc.) that enables participants to discern contextually relevant information in the conversation. The group messaging application can then provide a notification in the conversation indicating the contextual information from the group object. Upon viewing the conversation, the user can discern contextual information that is semantically relevant to participants of the conversation.

In some configurations, the group messaging application executes on the aforementioned mobile device. The group messaging application can provide a graphical user interface (GUI) to enable a user to interact with the application. The mobile device can display the GUI for the group messaging application. In some configurations, the mobile device includes a touchscreen display for receiving user input to interact with the GUI. The following description discloses an example graphical user interface of the group messaging in which different user input can be received to perform different operations.

FIG. 1 conceptually illustrates an example graphical user interface in different stages for activating a group object in a conversation of a group messaging application. More specifically, FIG. 1 illustrates a graphical user interface 100 in different operational stages 110, 120, 130 and 140 for activating the group object in the conversation. As mentioned above, the group messaging application can execute on the mobile device in one example.

In the first stage 110, a conversation view of a graphical user interface (GUI) 100 of a particular conversation in the group messaging application is shown. The GUI 100 includes a title bar 105, a set of avatars 112, 114, 116 and 118 and a set of group messages 122, 124 and 126. The title bar 105 can represent a title for the conversation (e.g., shown as "Portland Socialites"). The set of avatars 112-118 can be thumbnail images (or similar graphical representation such as an icon) that represent different participants in the conversation. The set of group messages 122-126 represent different messages by the participants in the conversation. Collectively, the set of group messages 122-126 represents a stream of updates for the conversation. For instance, each group message can include comments and other data posted by different participants of the conversation. In some configurations, a group message in the conversation view can include image (i.e., photos or pictures) and video content shared by one or more participants.

Each conversation can include one or more different group objects that provide different functionality for the participants in the conversation. A group object therefore can be understood as extending the functionality of the group messaging application. As further shown in the first stage 110, the GUI 100 includes a group object graphical element 128 adjacent to the set of avatars 112-118. In the example shown in FIG. 1, the group object graphical element 128 represents a group object that provides functionality related to a planning or scheduling application for participants of the conversation. In some instances, a user can activate the group object by performing a swipe gesture 125 across a touchscreen of a mobile device. Alternatively or conjunctively, the group object can be activated upon receiving a user input that selects the group object graphical element 128 (e.g., a key press, non-gesture touch selection, etc.). Further, the group object can be activated in some configurations by a combination of a non-gesture touch selection and a subsequent gesture. For example, using a touchscreen, the user can initially select the group object graphical element 128 and then perform a gesture that drags the group object graphical element 128 downward into the area of GUI 100 occupied by the set of groups messages 122-126 (i.e., the stream).

In the second stage 120, after the group object is activated, a detail view for the group object is displayed in the GUI 100. In the example of the group object providing planning functionality, the user can then edit various options shown in the detail view for creating a scheduled event. The avatar 112 corresponds to the user that is authoring or creating the scheduled event. The GUI 100 can provide a text box 130 for inputting a title for the planning group object. A set of buttons 132 can be included to provide different responses (as shown e.g., Yes, Maybe, No) for interacting with the planning group object. A map image 134 can be shown in the GUI 100 corresponding to a location provided in a location box 136. As shown, the location box 136 can include different graphical elements to indicate the location of a place or map point and different options for getting directions and changing the location. The GUI 100 further includes a time box 138 for indicating a time for the scheduled event. In one example, the user can select the desired time by entering input into the time box 138 (e.g., by entering a specified time, or manipulating a drop down box with a list of available times by hour and/or minute increments). After the user has finished editing the scheduled event, the user can exit the detail view by selecting a button 135 to return to the conversation view of the group messaging application.

As shown in the third stage 130, the GUI 100 includes a group object instance 145 in the conversation view as a new update in the stream. The group object instance can be conceptually understood as another "layer" that executes and is presented in the conversation view. The GUI 100 could display the group object instance 145 in different ways. In the example shown in the third stage 130, the group object instance 145 is shown as including a set of graphical elements in the conversation view. For instance, the group object instance 145 includes a title 148 of the scheduled event as set in the second stage 120, a graphical representation 146 of the group object (e.g., corresponding to the group object graphical representation 128) and an avatar 144 of the user/participant (e.g., corresponding to the user with avatar 112) that created the group object. The group object instance 145 also includes a button 142 to enable the user to view the group object in a detail view (similar to the view shown in the second stage 120).

After the group object instance 145 is shown in the stream for a first user, corresponding group object instances will be shown in the conversation view for each participant on that participant's client device running the group messaging application. When a user modifies the group object, a notification can appear in the GUI 100 to indicate that the group object is updated. For instance, as shown in the fourth stage 140, the GUI 100 includes a notification graphical element 150 to indicate a number of updates to the group object. The notification graphical element alerts the participants in the conversation that the group object has been updated by another participant. In this fashion, this form of notification in the example of FIG. 1 can provide semantically relevant content to one or more participants in the conversation.

In the example of FIG. 1, the fourth stage 140 shows that one update for the group object is received from a participant. Notifying the participants of the conversation could occur in different ways. By way of example, a notification could be presented as a pop up window (e.g., with corresponding text indicating an update to the group object), an audible alert (e.g., chime or buzz), etc. Moreover, a notification can be provided in the GUI 100 in a real-time manner (e.g., immediately after a user modifies the group object) or on a periodic basis (e.g., by having the group application periodically poll the group object for updates). In this manner, the group object represents a shared state for the participants of the conversation in which updates to the group object are communicated to each participant.

The subject technology provides a platform to extend the functionality of the group messaging application. Although FIG. 1 illustrates an example for adding a group object that provides planning/scheduling functionality for the participants in the conversation, the subject technology can provide other group objects that provide different functionality for participants in the conversation. For instance, different group objects for providing functionality such as location sharing, photo sharing, video sharing, gaming, money sending, video calling, audio calling, and a map view of one or more participants in the conversation could be provided. Other types of functionality and applications could be provided as a group object and still be within the scope of the subject technology.

By way of example, the aforementioned location sharing group object can be event driven such that notifications are provided to participants of the conversation when an event occurs with respect one or more participants. For example, a notification can be provided when a participant's location is within a threshold distance from another participant's location. By utilizing the location sharing group object, a participant in the conversation can opt into sharing the participant's location with the other participants of the conversation.

In the example of a photo or video sharing group object, the photos and videos shared by participants are inclusive to the conversation (i.e., not available outside of the context of the conversation). Thus, when a user adds photos or videos to such a group object, the shared content is only accessible by the participants in the conversation (e.g., by selecting the corresponding group object in the conversation view). Alternatively or conjunctively, the user can add publicly accessible photos or videos to the photo or video sharing object. In these manners, a photo or video sharing group object provides non-textual content to the conversation.

For providing gaming functionality, a gaming group object can be provided to enable participants of the conversation to interact with a game. In particular, a turn-based game (e.g., Tic-Tac-Toe, hangman, etc.) could be provided by a gaming group object that allows the participants of the conversation to play the game amongst each other. Updates to the state of the game could then appear in the context of the conversation to the participants.

For a different user/participant, a group object instance can appear in the same conversation after an authoring user adds the group object to the conversation (e.g., by being the author of the group object as described above in FIG. 1). The group object instance will then appear in the non-author user's stream in the conversation view for the same conversation. The group object instance therefore can be understood as providing a shared state for participants of the conversation. The user can then modify the group object as described in further detail below to update the shared state.

Figure 2:
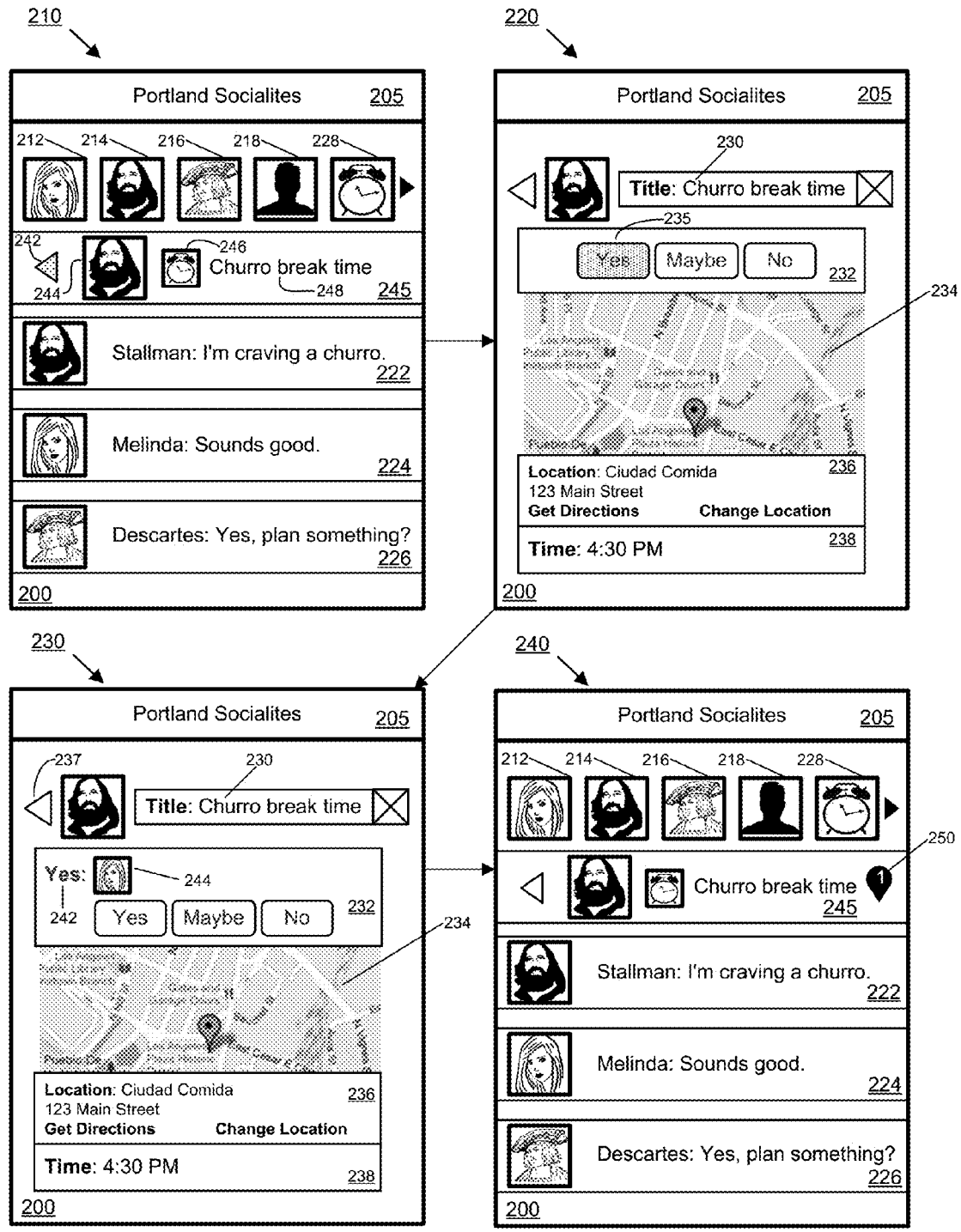
FIG. 2 conceptually illustrates an example graphical user interface in different stages for modifying a group object in a conversation of a group messaging application.

FIG. 2 conceptually illustrates an example graphical user interface 200 in different stages for modifying a group object in a conversation of a group messaging application. In particular, FIG. 2 illustrates an example in which a user interacts with the GUI 200 in order to respond to a group object providing planning functionality (as discussed in connection with FIG. 1). The GUI 200 includes similar corresponding graphical elements to those discussed in connection with the GUI 100 in FIG. 1. Thus, a description in detail of graphical elements in GUI 200 corresponding with elements in the GUI 100 is not provided to avoid obscuring the description of FIG. 2 with repetitious subject matter.

As shown in the first stage 210, the GUI 200 includes a title bar 205, a set of avatars 212-218, a group object graphical element 228, a set of group messages 222-226, and a group object instance 245. In the example shown in FIG. 2, the avatar 212 represents the user viewing the conversation view in the GUI 200. For instance, the user represented by the avatar 212 can view the GUI 200 on a mobile device running an instance of the group messaging application. The first stage 210 further shows the group object instance 245 including a title 248, a graphical representation 246 of the group object, and an avatar 244 of the user/participant that created the group object. The user can select a button 242 (as highlighted) included in the group object instance 245 to view the details of the group object.

In the second stage 220, the GUI 200 displays a detail view of the selected group object instance 245 from the first stage 210. The detail view includes a text box 230 indicating a title, a set of buttons 232 for interacting with the group object, a map image 234, a location box 236 and a time box 238. For a planning group object, the user can select a button 235 (as shown in highlight) from the set of buttons 232 for responding to the scheduled event shown in the detail view.

After selecting the button 235 from the second stage 220, the GUI 200 is updated with the user's input responding to the planning group object. As shown in the third stage 230, the GUI 200 displays a text field 242 and an avatar 242 to indicate that the user has responded to the planning group object (i.e., by previously selecting the button 235 corresponding to "Yes" from the second stage 220). The GUI 200 of the group object therefore provides contextual content to the participants in the conversation via the planning functionality. For example, the contextual content can indicate a participant's activity or input associated with the planning functionality of the example group object. The user can then exit the detail view by selecting a button 237 to return to the conversation view of the group messaging application.

In the fourth stage 240, the GUI 200 displays a notification graphical element 250 with the group object instance 245. In some configurations, the notification graphical element 250 is included in the GUI 200 after the user responds to the group object instance in the third stage 230. Alternatively, the GUI 200 can forgo displaying the notification graphical element 250 so that the user is only alerted of updates when another user or participant of the conversation has modified the group object (i.e., no notification is displayed when the user updates the group object).

Figure 3:
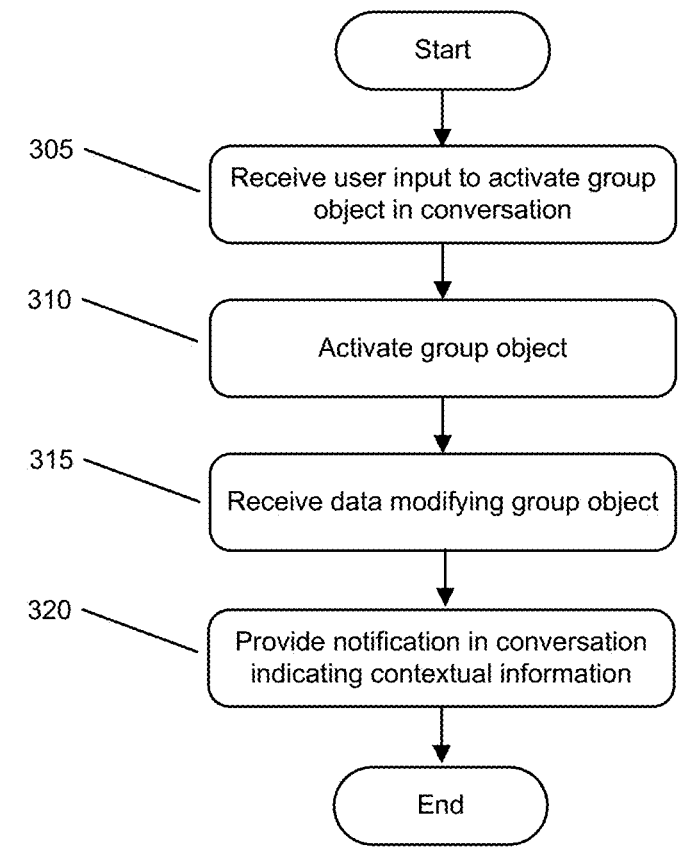
FIG. 3 conceptually illustrates an example process for activating and modifying a group object in a group messaging application.

The following discussion describes an example process for activating and modifying a group object as described above with reference to FIGS. 1 and 2. FIG. 3 conceptually illustrates an example process 300 for activating and modifying a group object in a group messaging application. FIG. 3 will be described below by reference to relevant portions of FIGS. 1 and 2.

The process 300 begins when user input is received at 305 to activate a group object in a conversation between two or more participants. Referring to FIG. 1, a user can perform a swipe gesture on a touchscreen to activate a planning group object (as depicted by group object graphical element 128) in the first stage 110. Alternatively or conjunctively, the user can also perform a non-gesture selection (e.g., a key press, a touch selection, mouse click selection, etc.) of the group object graphical element 128 to activate the group object, or a combination of a non-gesture selection and a gesture input to activate the group object.

At 310, the process 300 activates the group object in response to the received user input. Upon activation, the group object executes in parallel with the conversation and can be understood as another layer for the conversation. By reference to FIG. 1, the GUI 100 in the second stage 120 displays the detail view of the planning group object including different options (depicted as a set of graphical elements) in which the authoring user can interact to create the scheduled event for the participants in the conversation. The group object is now included in the conversation view of the GUI 100 as shown in the third stage 130 of FIG. 1. The group object therefore provides a functionality (e.g., planning) applied to all participants of the conversation. For instance, referring to FIG. 2, as shown in the first stage 210 the group object is included in the conversation view of the GUI 200 for the non-authoring user corresponding to the avatar 212. Upon viewing the conversation view of the group messaging application, the user can view that the group object instance 245 now included in the user's stream of group messages. Thus, the group object instance 245 provides contextual content within the conversation view (e.g., the title 248, the graphical representation 246 of the group object, and the avatar 244 of the user/participant).

The process 300 at 315 receives data modifying the group object. Within the context of the conversation, each participant can modify the group object. Referring to FIG. 2, the user in the second stage 220 can select the button 235 to respond to the planning group object for the scheduled event. In the third stage 230 of FIG. 2, the detail view of the group object now includes contextual information in the form of the text field 242 and the avatar 242 to indicate the user's modification of the planning group object.

After modifying the group object, contextual information is provided to all participants through the functionality of the group object. The process 300 continues to 320 to provide a notification in the conversation to indicate the contextual information. Referring to FIG. 2, the notification graphical element 250 is shown in the fourth stage 240 to indicate the contextual information. In the example of FIG. 2, the contextual information indicates that the user has modified the group object in the form of a number of updates received by the group object. By reference to FIG. 1, in the fourth stage 140, the notification graphical element 150 is semantically relevant to the authoring user of the group object because it indicates that another participant in the conversation has responded to the scheduled event. The process 300 then ends.

The following section describes an example computing environment including a system that can implement the above described process and GUIs as a computer program running on a particular machine, such as a computer or mobile device, or stored as instructions in a computer readable medium.

Figure 4:
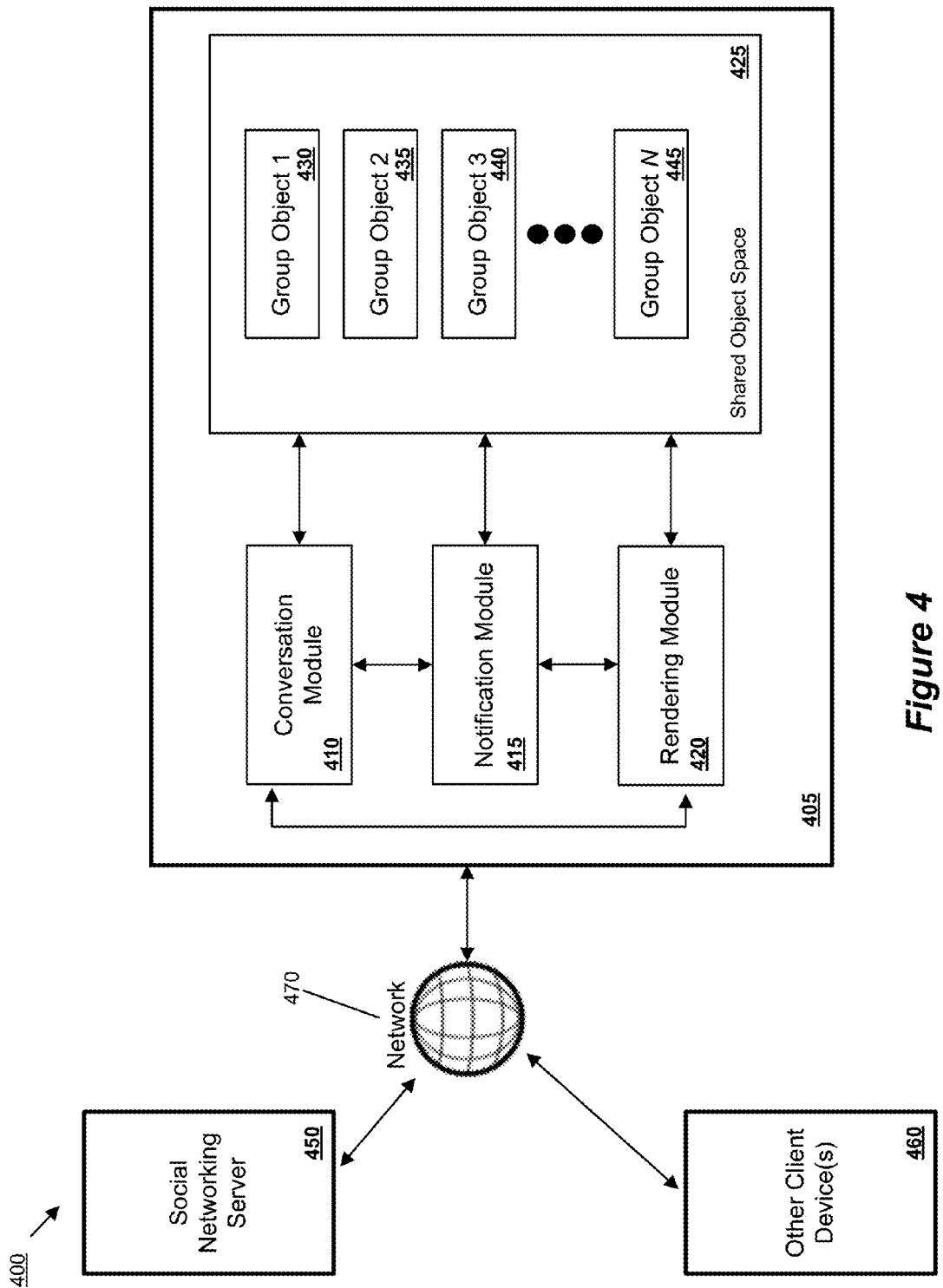
FIG. 4 conceptually illustrates an example computing environment including a system for providing a platform for group interactivity of some configurations.

FIG. 4 conceptually illustrates an example computing environment 400 including a system for providing a platform for group interactivity of some configurations. In particular, FIG. 4 shows a client device 425 for implementing the above described GUIs in FIGS. 1 and 2 and the process 300 in FIG. 3 for activating and modifying a group object. In some configurations, the client device 425 is a mobile device that is configured to wirelessly communicate with other client devices and/or a social networking server.

As shown in FIG. 4, the client device 405 includes several modules for providing different functionality. The client device 425 is configured to include a conversation module 410, a notification module 415, a rendering module 420 and a shared group object module 425. The conversation module 410 is configured to initiate a conversation between two or more participants. The shared group object module 425 is configured to provide one or more group objects 430-445. In one example, the shared group object module 425 provides 1 to N number of group objects (e.g., corresponding to the group objects 430, 435, 440 and 445) that reside in a shared object space. The rendering module 420 is configured to provide a user-interface for interacting with the group objects from the shared group object module 425 and configured to receive user input for interacting with the group objects. For example, the rendering module 420 can display the one or more group objects in the conversation view of the user-interface of the group messaging application and receive input to manipulate the group objects. The notification module 415 is configured to provide one or more notifications in the user-interface in which contextually relevant information for the participants of the conversation is provided. In particular, the notification module can provide the notifications after a user/participant modifies a group object. Alternatively, the notification module 415 can provide the notification(s) on a periodic basis (e.g., by polling the group object for updates).

As further shown in FIG. 4, each of the aforementioned modules can be configured to communicate between each other. For instance, different data, messages, API calls and returns can be passed between the different modules in the client device 405.

The client device 405 can communicate over a network 470 with a social networking server 450 and one or more other client devices 460. The social networking server 450 can be configured to communicate with the aforementioned modules of the client device 405. In some configurations, the social networking server 450 can be configured to receive one or more different third party group objects that provide additional functionality to the platform. For instance, a third party can upload a group object to the social networking server 450 for hosting within the server's computing environment. The social networking server 450 can be configured to instantiate a group object in a conversation including two or more participants in which the group object provides an additional functionality in the conversation. The social networking server 450 can receive data over the network 470 from the client device 405 for modifying the group object in the conversation in which the data includes contextual information for the participants in the conversation. The social networking server 450 is further configured to modify the group object based on the received data. In one example, modifying the group object based on the received data can include updating the group object to indicate a participant's interaction with the group object in the conversation. After modifying the group object, the social networking server 450 can transmit a notification indicating the contextual information over the network 470 to the client device 405 (e.g., one of the participants in the conversation) in which the notification represents an update to the group object that is communicated to the participants in the conversation. Upon receiving the notification, the client device 405 can render the update (e.g., in a conversation view of a GUI of a group messaging application as described above in FIGS. 1 and 2) to the group object for presentation to the participant in the conversation.

Although the example in FIG. 4 describes that the client device 405 can be a mobile device, it should be understood that the platform for providing group objects is not limited to such a mobile device. In some configurations, the client device 405 and its associated modules can communicate with the one or more other client devices 460, which could include a desktop computer, another mobile device and/or a tablet device, etc. The one or more other client devices 460 can be associated with the other participants in the conversation.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software components can also be implemented as separate programs. Finally, any combination of separate programs that together implement a software component described here is within the scope of the disclosure. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

The following description provides a detailed description of an example mobile device architecture in which a group messaging application can execute. Moreover, the mobile device architecture can provide the hardware in order to implement and provide the platform for providing semantic group objects that extend the functionality for the group messaging application.

Figure 5:
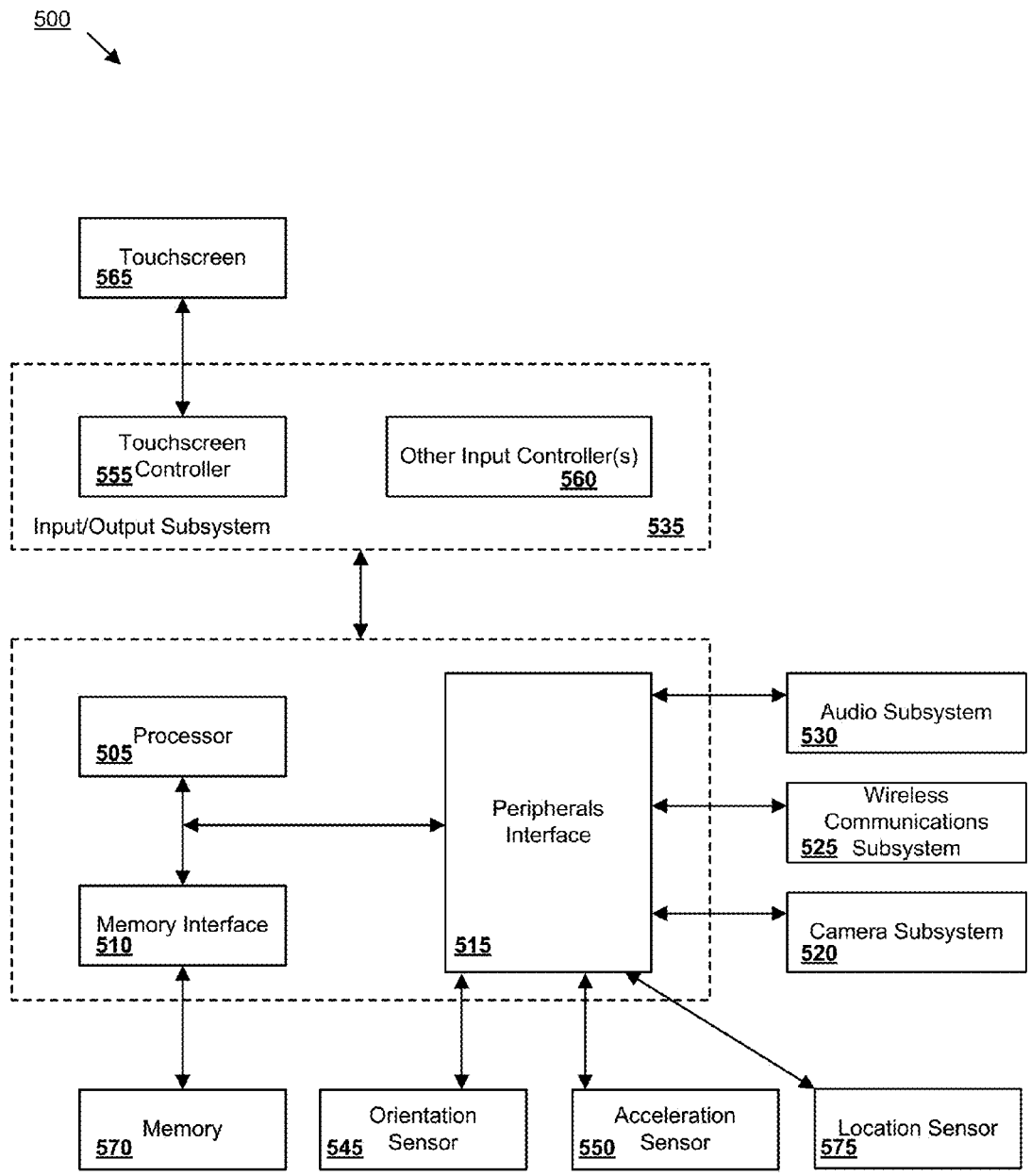
FIG. 5 illustrates an example architecture for a mobile device that a user in a conversation can utilize for interacting with a group messaging application.

FIG. 5 is an example of a mobile device architecture 500. The implementation of a mobile device can include one or more processing units 505, memory interface 510 and a peripherals interface 515. Each of these components that make up the computing device architecture can be separate components or integrated in one or more integrated circuits. These various components can also be coupled together by one or more communication buses or signal lines.

The peripherals interface 515 can be coupled to various sensors and subsystems, including a camera subsystem 520, a wireless communication subsystem(s) 525, audio subsystem 530 and Input/Output subsystem 535. The peripherals interface 515 enables communication between processors and peripherals. The peripherals provide different functionality for the mobile device. Peripherals such as an orientation sensor 545 or an acceleration sensor 550 can be coupled to the peripherals interface 515 to facilitate the orientation and acceleration functions. Additionally, the mobile device can include a location sensor 575 to provide different location data. In particular, the location sensor can utilize a Global Positioning System (GPS) to provide different location data such as longitude, latitude and altitude.

The camera subsystem 520 can be coupled to one or more optical sensors such as a charged coupled device (CCD) optical sensor or a complementary metal-oxide-semiconductor (CMOS) optical sensor. The camera subsystem 520 coupled with the sensors can facilitate camera functions, such as image and/or video data capturing. Wireless communication subsystems 525 can serve to facilitate communication functions. Wireless communication subsystems 525 can include radio frequency receivers and transmitters, and optical receivers and transmitters. The aforementioned receivers and transmitters can be implemented to operate over one or more communication networks such as a Long Term Evolution (LTE), Global System for Mobile Communications (GSM) network, a Wi-Fi network, Bluetooth network, etc. The audio subsystem 530 is coupled to a speaker and a microphone to facilitate voice-enabled functions, such as voice recognition, digital recording, etc.

I/O subsystem 535 involves the transfer between input/output peripheral devices, such as a display, a touchscreen, etc., and the data bus of the processor 505 through the Peripherals Interface. I/O subsystem 535 can include a touchscreen controller 555 and other input controllers 50 to facilitate these functions. Touchscreen controller 555 can be coupled to the touchscreen 55 and detect contact and movement on the screen using any of multiple touch sensitivity technologies. Other input controllers 50 can be coupled to other input/control devices, such as one or more buttons.

Memory interface 510 can be coupled to memory 570, which can include high-speed random access memory and/or non-volatile memory such as flash memory. Memory 570 can store an operating system (OS). The OS can include instructions for handling basic system services and for performing hardware dependent tasks.

By way of example, memory can also include communication instructions to facilitate communicating with one or more additional devices, graphical user interface instructions to facilitate graphic user interface processing, image/video processing instructions to facilitate image/video-related processing and functions, phone instructions to facilitate phone-related processes and functions, media exchange and processing instructions to facilitate media communication and processing-related processes and functions, camera instructions to facilitate camera-related processes and functions, and video conferencing instructions to facilitate video conferencing processes and functions. The above identified instructions need not be implemented as separate software programs or modules. Various functions of mobile device can be implemented in hardware and/or in software, including in one or more signal processing and/or application specific integrated circuits.

The following description describes an example system in which aspects of the subject technology can be implemented.

Figure 6:
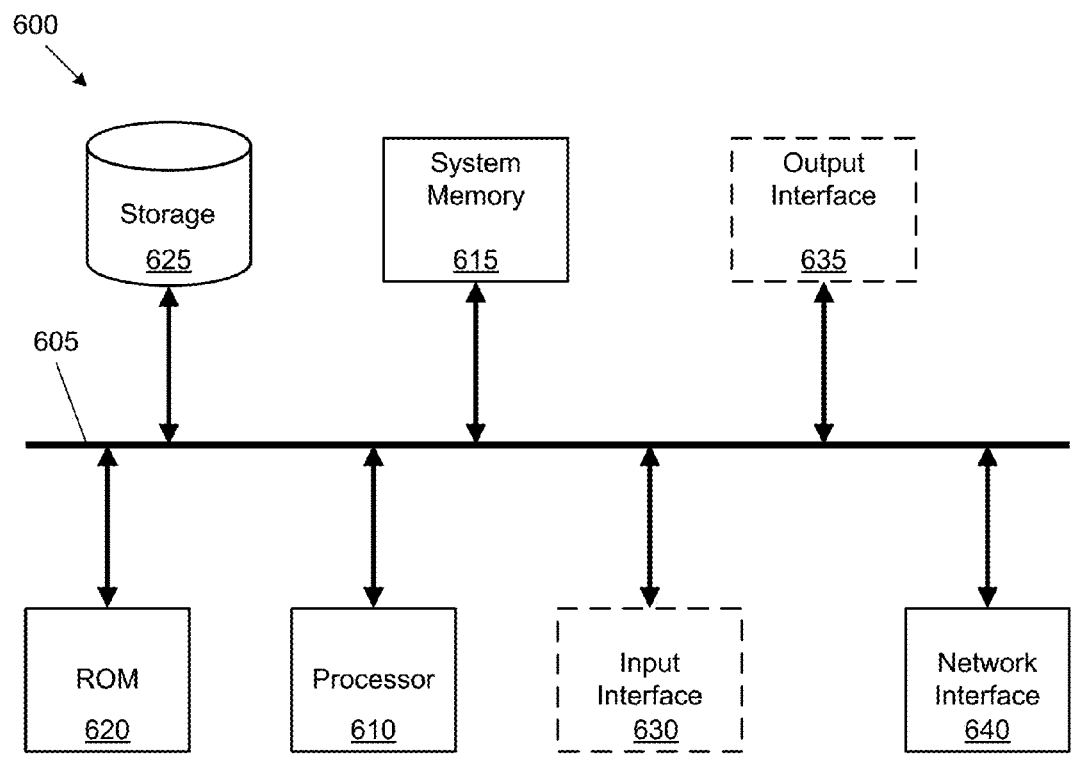
FIG. 6 conceptually illustrates a system with which some implementations of the subject technology may be implemented.

FIG. 6 conceptually illustrates a system 600 with which some implementations of the subject technology can be implemented. The system 600 can be a computer, phone, PDA, or any other sort of electronic device. Such a system includes various types of computer readable media and interfaces for various other types of computer readable media. The system 600 includes a bus 605, processing unit(s) 610, a system memory 615, a read-only memory 620, a storage device 625, an optional input interface 630, an optional output interface 635, and a network interface 640.

The bus 605 collectively represents all system, peripheral, and chipset buses that communicatively connect the numerous internal devices of the system 600. For instance, the bus 605 communicatively connects the processing unit(s) 610 with the read-only memory 620, the system memory 615, and the storage device 625.

From these various memory units, the processing unit(s) 610 retrieves instructions to execute and data to process in order to execute the processes of the disclosed technologies. The processing unit(s) can be a single processor or a multi-core processor in different implementations.

The read-only-memory (ROM) 620 stores static data and instructions that are needed by the processing unit(s) 610 and other modules of the system 600. The storage device 625, on the other hand, is a read-and-write memory device. This device is a non-volatile memory unit that stores instructions and data even when the system 600 is off. Some implementations of the disclosed technologies use a mass-storage device (such as a magnetic or optical disk and its corresponding disk drive) as the storage device 625.

Other implementations use a removable storage device (such as a flash drive, a floppy disk, and its corresponding disk drive) as the storage device 625. Like the storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the disclosed technologies' processes are stored in the system memory 615, the storage device 625, and/or the read-only memory 620. For example, the various memory units include instructions for processing multimedia items in accordance with some implementations. From these various memory units, the processing unit(s) 610 retrieves instructions to execute and data to process in order to execute the processes of some implementations.

The bus 605 also connects to the optional input and output interfaces 630 and 635. The optional input interface 630 enables the user to communicate information and select commands to the system. The optional input interface 630 can interface with alphanumeric keyboards and pointing devices (also called "cursor control devices"). The optional output interface 635 can provide display images generated by the system 600. The optional output interface 635 can interface with printers and display devices, such as cathode ray tubes (CRT) or liquid crystal displays (LCD). Some implementations can interface with devices such as a touchscreen that functions as both input and output devices.

Finally, as shown in FIG. 6, bus 605 also couples system 600 to a network interface 640 through a network adapter (not shown). In this manner, the computer can be a part of a network of computers (such as a local area network ("LAN"), a wide area network ("WAN"), or an Intranet, or an interconnected network of networks, such as the Internet. Any or all components of system 600 can be used in conjunction with the disclosed technologies.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

Various modifications to the aspects described are within the scope of the disclosure, and the generic principles defined herein can be applied to other aspects. Thus, the claims below are not intended to be limited to the aspects shown herein, but are to be accorded the full scope consistent with the language therein.

All structural and functional equivalents to the elements of the various aspects described throughout this disclosure that are known or later come to be known to those of ordinary skill in the art are expressly incorporated herein by reference and are intended to be encompassed by the claims below. Moreover, nothing disclosed herein is intended to be dedicated to the public regardless of whether such disclosure is explicitly recited in the claims.

What is claimed is:

1. A machine-implemented method comprising:
receiving first user input selecting a group object graphical element to activate a new group object instance, from a participant of a plurality of participants in a conversation at the first group messaging application between the plurality of participants, the conversation enabling communication between the plurality of participants of the conversation, the communication including a real-time stream of messages exchanged by one or more participants of the plurality of participants and viewable by the plurality of participants of the conversation, wherein the new group object instance provides additional functionality for interaction between the plurality of participants in the conversation, wherein each of the plurality of participants is able to view and interact with the new group object instance within the conversation;
responsive to the received first user input, placing the new group object instance within the real-time stream of messages included in the conversation, wherein the new group object instance comprises user-updateable data and operates independently of the real-time stream of messages while being displayed graphically within the real-time stream of messages, the graphical display of the new group object instance remaining in the real-time stream of messages during the conversation and comprising a graphical component for initiating display of a detail view of the new group object instance from the real-time stream of messages;
receiving, from within the real-time stream of messages, second user input selecting the graphical component;
displaying the detail view in response to the received second user input, the detail view including an interface for modifying the user-updateable data of the new group object instance;
receiving third user input in association with the interface for modifying the user-updateable data of the new group object instance in the conversation; and providing, based on the received third user input, a notification within the real-time stream of messages, wherein the notification represents a modification of the user-updateable data based on the third user input and is communicated to the plurality of participants in the conversation by the new group instance while within the real-time stream of messages.

2. The method of claim 1, wherein the new group object instance provides functionality including one of location-sharing, photo sharing, video sharing, gaming, calendar, planning, money sending, video calling, audio calling, and a map view of one or more participants in the conversation.

3. The method of claim 1, wherein the notification is semantically relevant to one or more participants of the conversation.

4. The method of claim 1, wherein the group object graphical element is represented as a graphical icon among a plurality of avatars, each avatar representing a respective one of the plurality of participants.

5. The method of claim 1, wherein the notification in the conversation comprises a graphical element indicating a number of updates received by the new group object instance.

6. The method of claim 1, wherein the new group object instance executes in parallel with the conversation.

7. The method of claim 1, wherein the new group object instance provides a functionality applied to all participants of the conversation.

8. The method of claim 7, wherein the functionality includes providing contextual content to all participants of the conversation.

9. The method of claim 1, wherein the first user input to activate the new group object instance comprises a swipe gesture on a touchscreen.

10. The method of claim 1, wherein the first user input to activate the new group object instance comprises a non-gesture touch input and a gesture touch input on a touchscreen.

11. The method of claim 1, wherein the interface of the detail view of the new group object instance includes a set of options for modifying the user-updateable data of the new group object instance.

12. The method of claim 11, wherein the displayed set of options corresponding to the planning group object comprises a title of the event, one or more response options for interacting with the planning group object, a location of the event, a map corresponding to the location of the event, or a time for the event.

13. The method of claim 1, wherein the one or more participants of the conversation comprises at least one contact that was previously selected by the user for including in the conversation.

14. A system comprising:
one or more processors; and
a memory storing instructions which when executed by the one or more processors, cause the one or more processors to perform operations comprising:
receiving first user input selecting a group object graphical element to activate a new group object instance, from a participant of a plurality of participants in a conversation at the first group messaging application between the plurality of participants, the conversation enabling communication between the plurality of participants of the conversation, the communication including a real-time stream of messages exchanged by one or more participants of the plurality of participants and viewable by the plurality of participants of the conversation, wherein the new group object instance provides additional functionality for interaction between the plurality of participants in the conversation, wherein each of the plurality of participants is able to view and interact with the new group object instance within the conversation;
responsive to the received first user input, placing the new group object instance within the real-time stream of messages included in the conversation, wherein the new group object instance comprises user-updateable data and operates independently of the real-time stream of messages while being displayed graphically within the real-time stream of messages, the graphical display of the new group object instance remaining in the real-time stream during the conversation and comprising a graphical component for initiating display of a detail view of the new group object instance from the real-time stream of messages;
receiving, from within the real-time stream of messages, second user input selecting the graphical component;
displaying the detail view in response to the received second user input, the detail view including an interface for modifying the user-updateable data of the new group object instance;
receiving third user input in association with the interface for modifying the user-updateable data of the new group object instance in the conversation; and
providing, based on the received third user input, a notification within the real-time stream of messages, wherein the notification represents a modification of the user-updateable data based on the third user input and is communicated to the plurality of participants in the conversation by the new group instance while within the real-time stream of messages.

15. The system of claim 14, wherein the new group object instance provides functionality including at least one of location sharing, photo sharing, video sharing, planning, gaming, money sending, video calling, audio calling, and a map view of one or more participants in the conversation.

16. The system of claim 14, wherein the notification is provided based on a periodic poll of the new group object instance for updates by the first group messaging application.

17. The system of claim 14, further comprising:
a social networking server configured to communicate with the system.

18. The system of claim 17, wherein the social networking server is further configured to receive one or more different third party group objects that provide additional functionality to the system.

19. The system of claim 14, further comprising:
one or more client devices configured to communicate with the system, wherein the one or more client devices include one of a desktop computer, a mobile device or a tablet device.

20. The system of claim 19, wherein the one or more client devices are associated with the plurality of participants of the conversation.

21. A non-transitory machine-readable medium comprising instructions stored therein, which when executed by a machine, cause the machine to perform operations comprising:
receiving first user input selecting a group object graphical element to activate a new group object instance, from a participant of a plurality of participants in a conversation at a first group messaging application between the plurality of participants, the conversation enabling communication between the plurality of participants of the conversation, the communication including a real-time stream of messages exchanged by one or more participants of the plurality of participants and viewable by the plurality of participants of the conversation, wherein the new group object instance provides additional functionality for interaction between the plurality of participants in the conversation, wherein each of the plurality of participants is able to view and interact with the new group object instance within the conversation;

responsive to the received first user input, placing the new group object instance within the stream of messages included in the conversation, wherein the new group object instance comprises user-updateable data and operates independently of the real-time stream of messages while being displayed graphically within the real-time stream of messages, the graphical display of the new group object instance remaining in the real-time stream of messages during the conversation and comprising a graphical component for initiating display of a detail view of the new group object instance from the real-time stream of messages;

receiving, from within the real-time stream of messages, second user input selecting the graphical component displaying the detail view in response to the received second user input, the detail view including an interface for modifying the user-updateable data of the new group object instance;

receiving third user input in association with the interface for modifying the user-updateable data of the new group object instance in the conversation; and providing, based on the received third user input, a notification within the real-time stream of messages, wherein the notification represents a modification of the user-updateable data based on the third user input and is communicated to the plurality of participants in the conversation by the new group instance while within the real-time stream of messages.

22. The non-transitory machine-readable medium of claim 21, wherein the group object graphical element is represented as a graphical icon within a plurality of avatars, each avatar representing a respective one of the plurality of participants.

23. A method comprising:
displaying a new group object instance within a real-time message stream for a conversation, the conversation enabling communication between a plurality of participants, the real-time message stream comprising a plurality of messages exchanged by one or more participants of the plurality of participants and viewable by the plurality of participants of the conversation, wherein the new group object instance comprises user-updateable data and operates independently of the real-time message stream while being displayed graphically within the message stream, the graphical display of the new group object instance remaining in the real-time message stream during the conversation and provides additional functionality for interaction between the plurality of participants in the conversation, wherein each of the plurality of participants is able to view and interact with the new group object instance within the real-time message stream, and wherein the new group object instance includes a graphical component in the real-time message stream for initiating display of a detail view of the new group object instance from the real-time message stream;

receiving, from within the real-time message stream, first user input selecting the graphical component;

displaying the detail view in response to the received first user input, the detail view including an interface for modifying the user-updateable data of the new group object instance;

receiving second user input in association with the interface for modifying the user-updateable data of the new group object instance in the conversation; and providing, based on the received second user input, a notification within the real-time message stream, wherein the notification represents a modification of the user-updateable data based on the second user input and is communicated to the plurality of participants in the conversation by the new group instance while within the real-time message stream.

24. The method of claim of 23, wherein modifying the user-updateable data of the new group object instance based on the received second user input comprises updating the user-updateable data of the new group object instance to indicate interaction of a participant with the new group object instance in the conversation.

25. The method of claim 23, wherein the new group object instance comprises a planning group object that provides additional planning functionality for an event for the two or more participants of the conversation.

26. The method of claim 23, further comprising:
receiving additional user input to exit the detail view of the new group object instance.

* * * * *